(12) United States Patent
Ito et al.

(10) Patent No.: US 8,177,433 B2
(45) Date of Patent: May 15, 2012

(54) HYDRODYNAMIC BEARING UNIT

(75) Inventors: Kenji Ito, Kuwana (JP); Fuminori Satoji, Kuwana (JP); Hiroyasu Yamauchi, Tsukuba (JP); Mitsuo Maeda, Tsukuba (JP)

(73) Assignees: NTN Corporation, Osaka (JP); Sumitomo Chemical Co., Ltd, Tokyo-To (JP)

( * ) Notice: Subject to any disclaimer, the term of this patent is extended or adjusted under 35 U.S.C. 154(b) by 899 days.

(21) Appl. No.: 11/629,167

(22) PCT Filed: Aug. 2, 2005

(86) PCT No.: PCT/JP2005/014076
§ 371 (c)(1),
(2), (4) Date: Sep. 18, 2008

(87) PCT Pub. No.: WO2006/013838
PCT Pub. Date: Feb. 9, 2006

(65) Prior Publication Data
US 2009/0034888 A1 Feb. 5, 2009

(30) Foreign Application Priority Data
Aug. 3, 2004 (JP) ................................. 2004-226228

(51) Int. Cl.
*F16C 32/06* (2006.01)
(52) U.S. Cl. ...................................................... 384/100
(58) Field of Classification Search .................. 384/100, 384/107, 114; 360/99.08, 98.07
See application file for complete search history.

(56) References Cited

U.S. PATENT DOCUMENTS

| 6,390,681 | B1 | 5/2002 | Nakazeki et al. |
| 7,147,376 | B2 * | 12/2006 | Shimizu et al. ............... 384/107 |
| 2002/0135893 | A1 | 9/2002 | Hirose et al. |
| 2004/0017954 | A1 * | 1/2004 | Komori et al. ................ 384/100 |
| 2004/0028299 | A1 * | 2/2004 | Shishido et al. .............. 384/107 |
| 2007/0274617 | A1 | 11/2007 | Shibahara et al. |

FOREIGN PATENT DOCUMENTS

| JP | 05-112723 | 5/1993 |
| JP | 2000-291648 | 10/2000 |
| JP | 2002-298407 | 10/2002 |
| JP | 2003-172336 | 6/2003 |
| JP | 2003-314534 | 11/2003 |
| JP | 2005-315408 | 11/2005 |
| WO | 2005/098251 | 10/2005 |

OTHER PUBLICATIONS

International Search Report issued Nov. 1, 2005 in International (PCT) Application No. PCT/JP2005/014076.

* cited by examiner

*Primary Examiner* — Thomas R Hannon
(74) *Attorney, Agent, or Firm* — Wenderoth, Lind & Ponack, L.L.P.

(57) ABSTRACT

A housing for a hydrodynamic bearing unit of this type is formed from a resin material having high oil resistance and low outgassing property to ensure the cleanliness of the bearing unit. An ester-based lubricating oil is used as a lubricating oil filled inside the hydrodynamic bearing unit 1, and the housing 7 is formed from an LCP-based resin material.

18 Claims, 6 Drawing Sheets

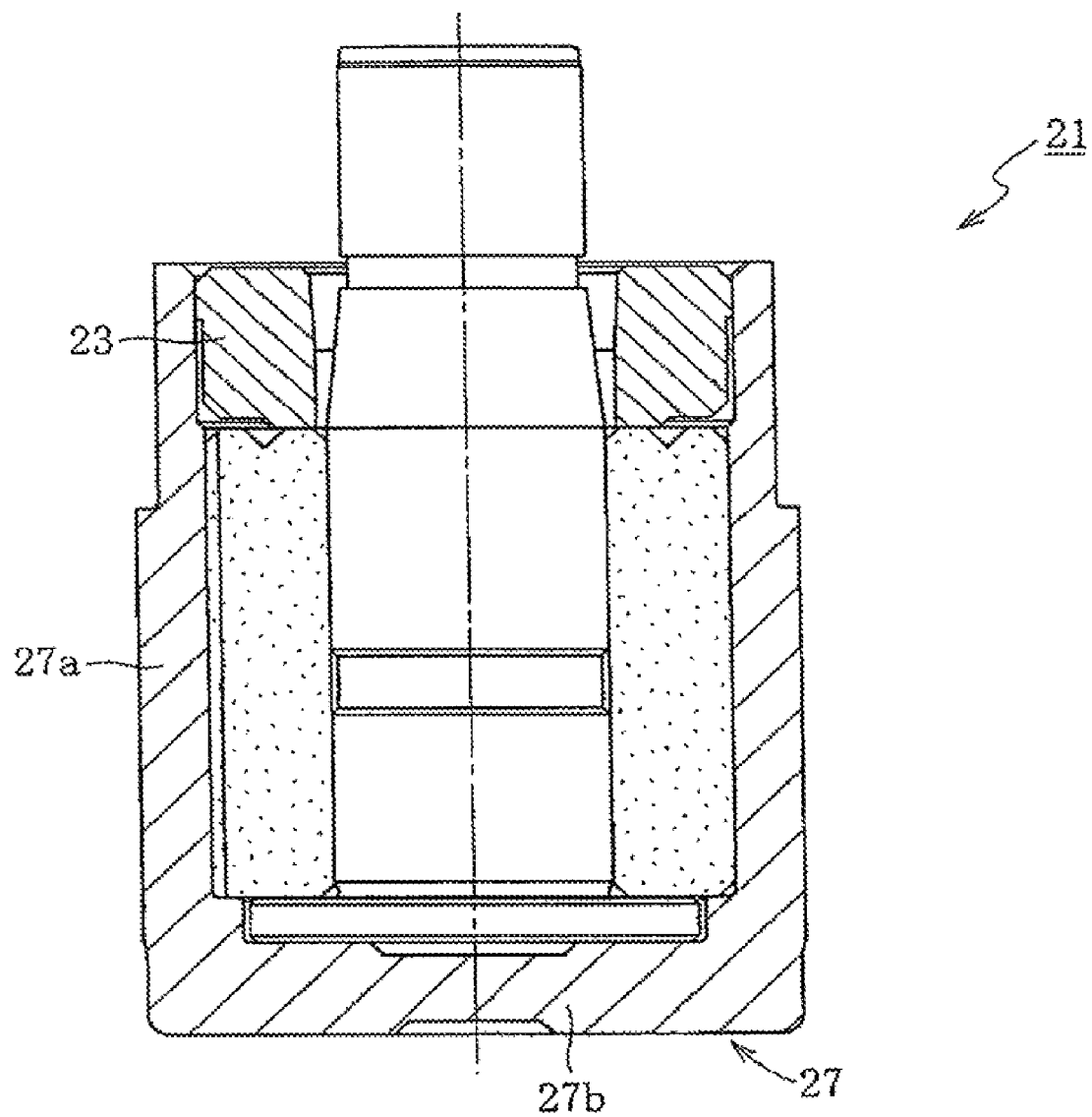

FIG. 7

| | Formulation Ex.1 | Formulation Ex.2 | Formulation Ex.3 | Formulation Ex.4 | Comp. Ex.1 | Comp. Ex.2 | Comp. Ex.3 | Comp. Ex.4 | Comp. Ex.5 |
|---|---|---|---|---|---|---|---|---|---|
| LCP | 53 | 61 | 61 | 53 | 73 | 69 | 43 | 87 | 49 |
| Carbon fiber | | | | 3 | | | | | 50 |
| Aluminum borate whisker | 40 | 30 | | 37 | 20 | 20 | 50 | 10 | |
| Zinc oxide whisker | | | 30 | | | | | | |
| Carbon black | 6 | 8 | 8 | 6 | 6 | 10 | 6 | 2 | |
| PTFE | 1 | 1 | 1 | 1 | 1 | 1 | 1 | 1 | 1 |
| Moldability | Good | Good | Good | Good | Good | Fair | Fair | Good | Fair |
| Coefficient of linear thermal expansion | Good | Good | Good | Good | Fair | Fair | Good | Fair | Good |
| Electrostatic removability | Good | Good | Good | Good | Poor | Good | Good | Poor | Good |
| Stretching | Good | Good | Good | Good | Good | Fair | Poor | Good | Poor |

FIG. 8

| | Formulation Ex.5 | Formulation Ex.6 | Formulation Ex.7 | Comp. Ex. 6 | Comp. Ex.7 | Comp. Ex.8 | Comp. Ex.9 | Comp. Ex.10 |
|---|---|---|---|---|---|---|---|---|
| LCP | 69 | 74 | 53 | 73 | 69 | 43 | 87 | 49 |
| Carbon fiber | 30 | 20 | 10 | 20 | 20 | | 10 | |
| Aluminum borate whisker | | | 30 | | | 50 | | 50 |
| Zinc oxide whisker | | | | | | | | |
| Carbon black | | 5 | 6 | 6 | 10 | 6 | 2 | |
| PTFE | 1 | 1 | 1 | 1 | 1 | 1 | 1 | 1 |
| Moldability | Good | Good | Good | Good | Fair | Fair | Good | Fair |
| Coefficient of linear thermal expansion | Good | Good | Good | Fair | Fair | Good | Fair | Good |
| Electrostatic removability | Good | Good | Good | Poor | Good | Good | Poor | Good |
| Stretching | Good | Good | Good | Good | Fair | Poor | Good | Poor |
| Wear resistance | Good | Good | Good | Poor | Poor | Poor | Fair | Poor |

HYDRODYNAMIC BEARING UNIT

TECHNICAL FIELD

The present invention relates to a hydrodynamic bearing unit supporting a shaft unit in a non-contact manner by the hydrodynamic effect of a fluid occurring in a radial bearing gap.

BACKGROUND ART

A hydrodynamic bearing unit is used for a small motor, for example, a spindle motor for a disk drive apparatus, a polygon scanning motor for a laser beam printer (LBP) and the like. There are demands for the above various kinds of motors with higher rotational accuracy, enhanced speed, reduced costs, reduced noise, etc. One of the components which determine these required performances is a bearing supporting the spindle of such a motor. In recent years, hydrodynamic bearings excellent in the required performances such as above are studied or actually used.

For example, in a spindle motor for storage disk drive apparatuses such as hard disks, a hydrodynamic bearing unit comprising a radial bearing portion and a thrust bearing portion is used. The radial portion supports a rotational member in a non-contact manner in the radial direction by the hydrodynamic effect of the lubricating fluid which occurs in a radial bearing gap between the rotational member and the bearing sleeve, and a thrust bearing portion supports the rotational member in a non-contact manner in the thrust direction by the hydrodynamic effect of the lubricating fluid which occurs in a thrust bearing gap between the housing and the rotational member (e.g., refer to Japanese Unexamined Patent Publication No. 2000-291648).

Since storage disk drive apparatuses such as the above hard disks are used in a relatively wide temperature range, a lubricating fluid having low evaporation rate and low viscosity is suitable for hydrodynamic bearing units used in the spindle motors of the above storage disk drive apparatuses. For example, ester-based lubricating oils are used (e.g., refer to Japanese Unexamined Patent Publication No. 2003-172336).

DISCLOSURE OF THE INVENTION

The hydrodynamic bearing unit having the above-described constitution comprises a housing, bearing sleeve, rotational member and the like. Efforts have been made to increase processing precision and assembly precision of parts to achieve required high rotation performance with advances in performance of information appliances. Meanwhile, with the trend of price reduction of information appliances, demand of reduced costs for hydrodynamic bearing units of this type is becoming higher. In response to these demands, recently, forming the housing with resin materials to reduce the production costs of housings is considered.

Ester-based lubricating oils used for a hydrodynamic bearing unit of this type contain an ester group, and thus have high reactivity with other components. Accordingly, products produced by reactions between resin materials forming the housing and lubricating oil may cause denaturation or deterioration of the lubricating oil or lower the cleanliness of the bearing unit. A resin housing is normally formed by injection molding of a resin material. Resin materials generate gases (outgases) in a high temperature atmosphere. In particular, in case of a bearing unit used for a disk drive apparatus such as a hard disk, for example, the disk surface of the hard disk, etc., is contaminated by the outgases generated in a high temperature atmosphere, leading to lowered cleanliness of the bearing unit or storage disk drive apparatus. Therefore, an object of the present invention is to ensure the cleanliness of a hydrodynamic bearing unit of this type by forming its housing from a resin material having high oil resistance and low outgassing property.

To achieve the above-mentioned object, the present invention provides a hydrodynamic bearing unit comprising a housing having an integral or a separate bottom, a bearing sleeve fixed to the inner periphery of the housing, and a rotational member which relatively rotates with respect to the bearing sleeve and the housing, the unit supporting the rotational member in a non-contact manner in the radial direction and the thrust direction by the hydrodynamic effect of a lubricating fluid occurring in the bearing gap, the lubricating fluid being an ester-based lubricating oil, and the housing being formed from a liquid-crystalline polymer (LCP) based resin material.

In the present invention, a liquid-crystalline polymer (LCP) is used as a base resin material for the housing. This resin has a strong interaction between molecular chains, and the polymeric chains orientate on the surface of the resin to a high degree, preventing a low-viscosity ester-based lubricating oil from entering into the resin. Among liquid-crystalline polymers (LCP), wholly aromatic thermotropic liquid-crystalline resins have especially high interaction between their polymeric chains due to the wholly aromatic groups and are excellent in packing property of the molecules. Therefore, the entry of the ester-based lubricating oil into the resin can be suppressed more effectively. Accordingly, forming the housing from the LCP-based resin material can impart high resistance to the ester-based lubricating oil to the housing. The above resin material also has the advantage of generating little outgas mainly when it becomes solidified. Furthermore, since the resin material has excellent characteristics such as low water absorbing property, high heat resistance, etc., the amount of the outgases generated while or after forming of the housing can be suppressed, and dimensional changes in the housing by water absorption can also be prevented by forming the housing from the above resin material. In addition, it imparts to the housing the resistance to a temperature rise inside the bearing while the motor is driven.

When a housing is formed from the above resin material (liquid-crystalline polymer), there arises an unavoidable necessity to add a filler to the above resin material for reinforcement. Considering especially that disk drive apparatuses such as hard disks are used in a wide temperature range, it is necessary to minimize the dimensional changes associated with temperature changes. Therefore in the present invention, at least one of carbon fiber and inorganic fiber is added to the resin material forming the housing, as a filler. Because a linear expansion coefficient of carbon fiber and inorganic fiber is lower than that of the resin material, the dimensional changes associated with temperature changes of a resin molded article (housing) containing the carbon fiber or inorganic fiber as a filler can be suppressed, increasing dimensional stability. Of course, since the carbon fiber or inorganic fiber serves as reinforcements, it is possible to obtain reinforcing effect on the resin housing by adding one of the fibers to the resin material. These dimension stabilizing effect and reinforcing effect can be sufficiently produced by adding the above filler in the amount of 15 wt. % or higher in total to the resin material. When the total amount of the filler is higher than 50 wt. %, the fluidity of the resin material in the mold may becomes insufficient, and other adverse effects may be produced on the moldability of the resin molded article (housing). Accordingly, the total amount of the filler is desirably 50 wt. % or lower.

When carbon fiber is used as a filler, wear resistance is greatly improved. Therefore, carbon fiber is preferably added to the resin material forming a region in the housing, especially for which the slidability with the rotational member is required, for example, the resin material forming the bottom and opening of the housing. To obtain necessary wear resistance, the added amount of the carbon fiber needs to be at least 5 wt. % or higher.

The housing is formed by injection-molding of a resin material. When the resin material is poured into molds, it may trap air inside the molds. The molds are usually provided with gas vents to release air inside the molds for easy filling, but these gas vents cannot discharge air trapped within the resin material to outside. Accordingly, air remaining within the resin material remains within the resulting resin molded article, causing voids and blisters in the molded article. This problem can be solved by adding 1 wt. % or higher of carbon fiber to the housing. This allows air within the resin material to be released to the outside of the molded article through the interface between carbon fiber exposed at the molded surface of the resin molded article and the resin surrounding this carbon fiber. The generation of voids within the molded article and blisters in the molded article can be thus avoided, improving the moldability of the resin molded article.

From the foregoing, the amount of carbon fiber contained in the filler is desirably at least 1 wt. % or larger, and particularly desirably 5 wt. % or larger when wear resistance is taken into consideration.

In contrast, when the amount of carbon fiber added is higher than 35%, the stretchability of the housing is lowered. For example, when other components (base plate and sealing member, etc.) are pressed into the housing, it is difficult to stretch the housing, lowering workability. Therefore, for use such as this, the amount of carbon fiber contained in the housing is desirably 35% or lower of the housing. Even in the cases where stretching is not a problem, when the amount of carbon fiber added is higher than 40 wt. %, moldability is greatly lowered. Hence, the amount of carbon fiber added is desirably 40 wt. % or lower.

Carbon fiber can be singly used as a filler, but in this manner, an increase in the amount of expensive carbon fiber used lowers economical efficiency. Therefore, from an economic perspective, inorganic fibers such as whiskers, which are single needle crystals, are preferably used as fillers in addition to carbon fiber. Particularly in the housing, a filler which does not contain carbon fiber but contain inorganic fiber as a main component can be used as a filler for regions for which the above slidability is not required. When the amount of inorganic fiber added is higher than 40 wt. %, moldability is also lowered. The amount of inorganic fiber added is thus desirably 40 wt. % or lower.

Among the above fillers, inorganic fiber which does not contain silicon (Si) is preferred. The presence of silicon causes gasified organic Si re-crystallization inside or around the bearing unit. The crystallized silicon may deposit to, for example, the disk surface or the head. Inorganic fiber which does not contain silicon, however, does not cause such a disadvantage and maintains the bearing unit or its surroundings cleaner.

For a housing of a bearing unit for use in a spindle motor for disk drive apparatuses such as hard disks, the conductivity for discharging static electricity generated while the motor is driven via the housing to the ground is required. As mentioned above, when a filler contains carbon fiber, the carbon fiber itself having average fiber length of 500 µm or larger has sufficient conductivity, thereby ensuring the conductivity of the housing. The carbon fiber having average fiber length of over 500 µm, however, is finely cut when the resin is fused again by screws for recycling and reuse (when the solidified resin material remaining on the runner and spool of the mold is reused). This results in a lowered reinforcing effect. This problem can be overcome by adding a powdery conductive agent as a filler.

As a powdery conductive agent, for example, carbon black, carbon nanomaterial, metal powder and the like can be used. In terms of the dispersibility in the resin material, low outgassing property and high resistance to deterioration of conductivity by recycling, especially carbon black is especially preferred among these. Carbon black is desirably added, for example, to the resin molded article such as the housing in an amount of 2-10 wt. %. when the amount of carbon black added is lower than 2 wt. %, carbon black does not allow carbon black to sufficiently function as a conductive agent in the resin molded article, while the amount added over 10 wt. % causes the moldability of the resin molded article disadvantages.

When the resin molded article formed from the resin material containing these fillers comprises welded joints with other components, the upper limit of the total amount of the filler may be 35 wt. %. This can sufficiently ensure the welding force with other components, while maintaining the moldability and dimensional stability of the resin molded article.

As mentioned above, according to the present invention, a housing can be formed from a resin material having high oil resistance and low outgassing property. This enables to keep a bearing unit and a disk drive apparatus incorporating this bearing unit highly clean. Moreover, a housing is formed from a resin material containing an appropriate amount of carbon fiber, inorganic fiber or a filler such as carbon black depending on its use, whereby a housing with excellent moldability, dimensional stability and electrostatic removability can be obtained.

BRIEF DESCRIPTION OF THE DRAWINGS

FIG. 6 is a cross-sectional view of a hydrodynamic bearing unit according to the third embodiment of the present invention.

FIG. 7 is the comparative test results on the characteristics required for the housing.

FIG. 8 is the comparative test results on the characteristics required for the housing.

DETAILED DESCRIPTION OF THE INVENTION

Embodiments of the present invention will be described below with reference to drawings.

Figure 1:
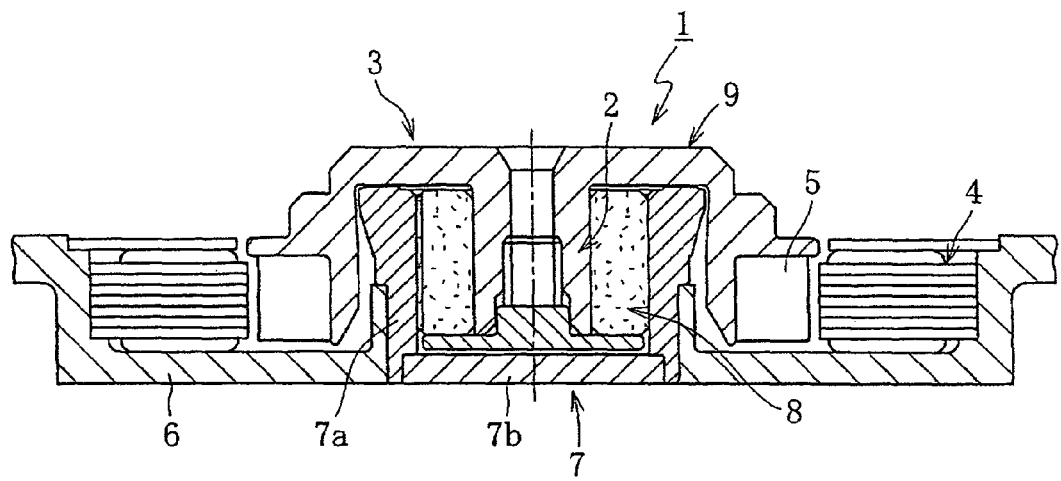
FIG. 1 is a cross-sectional view of a spindle motor incorporating a hydrodynamic bearing unit according the first embodiment of the present invention.

FIG. 1 conceptually shows a constitutional example of a spindle motor for an information appliance incorporating a hydrodynamic bearing unit 1 according to an embodiment of the present invention. This spindle motor for an information appliance is used for storage disk drive apparatuses such as hard disks, and comprises a hydrodynamic bearing unit 1 which rotatably supports a rotational member 3 having a shaft unit 2 in a non-contact manner and, a stator coil 4 and a rotor magnet 5 disposed opposite each other, for example, across a gap in the radial direction and the motor bracket 6. The stator coil 4 is attached to the outer periphery of the motor bracket 6, and the rotor magnet 5 is attached to the outer periphery of the rotational member 3. The housing 7 of the hydrodynamic bearing unit 1 is adhesive-bonded to the inner periphery of the motor bracket 6. One or a plurality of information storage medium disks such as magnetic disks are held on the rotational member 3. When an electric current is provided to the stator coil 4, the rotor magnet 5 is rotated by an electromagnetic force generated between the stator coil 4 and the rotor magnet 5, thereby rotating the rotational member 3 and the shaft unit 2 integrally.

Figure 2:
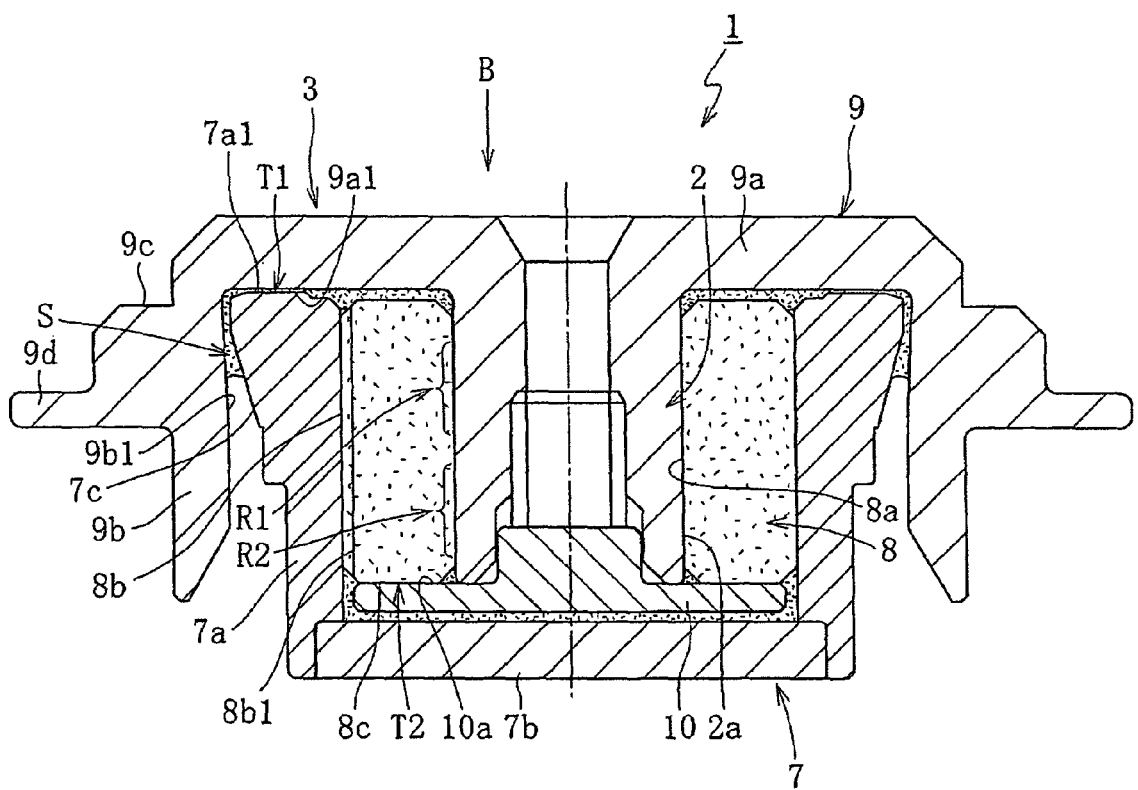
FIG. 2 is a cross-sectional view of a hydrodynamic bearing unit according to the first embodiment.

As shown in, for example, FIG. 2, the hydrodynamic bearing unit 1 comprises the housing 7, a bearing sleeve 8 fixed inside the housing 7, and the rotational member 3 which relatively rotates with respect to the housing 7 and the bearing sleeve 8. For the sake of explanation, the opening side of the housing 7 will be placed to the top, and the side opposite to the opening side is placed to the bottom below.

The rotational member 3 consists of a hub unit 9 disposed on, for example, the opening side of the housing 7 and the shaft unit 2 inserted into the inner periphery of the bearing sleeve 8.

The hub unit 9 comprises a disk portion 9a covering the opening side of the housing 7, a cylindrical portion 9b extending downward in the axial direction from the outer circumference of the disk portion 9a, a disk loading face 9c, and a brim 9d provided on the outer periphery of the cylindrical portion 9b. An unshown information storage medium disk is fitted onto the outer periphery of the disk portion 9a, and placed on the disk loading face 9c. The information storage medium disk is then held on the hub unit 9 by an unshown appropriate holding means.

In this embodiment, the shaft unit 2 is formed integrally with the hub unit 9, and separately comprises a flange portion 10 at its bottom edge as a stopper in the axial direction. The flange portion 10 is metallic, and is, for example, fixed to the shaft unit 2 by screw connection or other means.

The bearing sleeve 8 is formed in a cylindrical shape, for example, from a porous material comprising a sintered metal, especially a porous material comprising copper as a main ingredient.

Figure 3A:
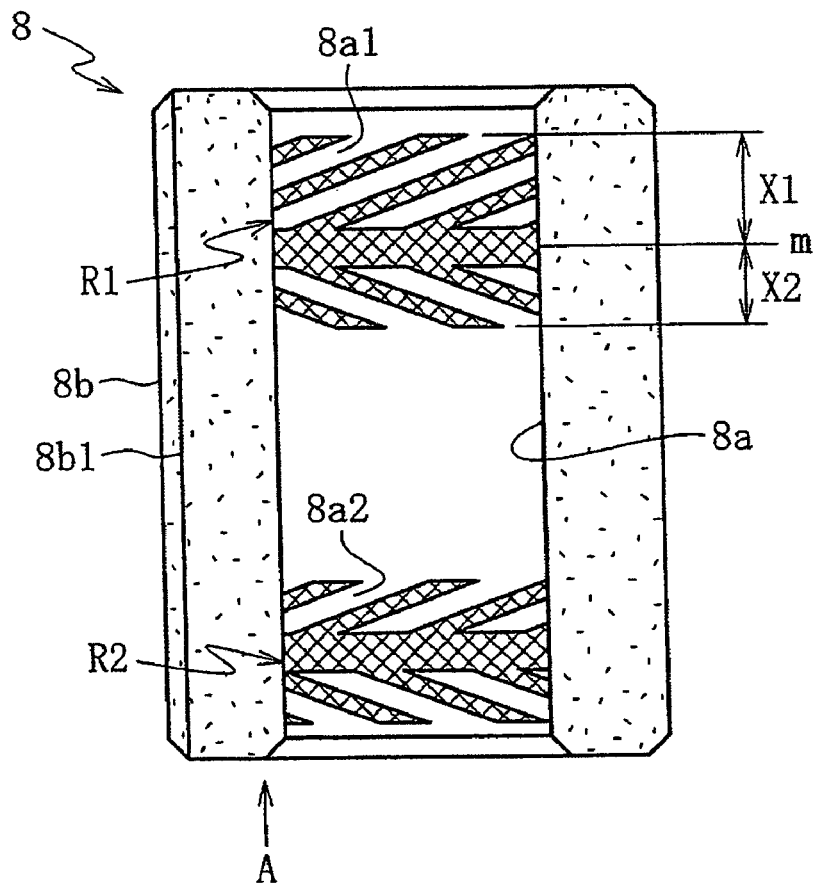
FIG. 3(a) is a longitudinal sectional view of a bearing sleeve.

As shown in FIG. 2, two upper and lower regions, which are the radial bearing faces of a first radial bearing portion R1 and a second radial bearing portion R2, are separately provided in the axial direction on the inner periphery face 8a of the bearing sleeve 8. In these two regions, for example, herringbone-shaped hydrodynamic grooves 8a1, 8a2 as shown in FIG. 3(a) are formed, respectively. The upper hydrodynamic groove 8a1 is formed asymmetrically in the axial direction with respect to a center m in the axial direction (the center of the region between the upper and lower slanting grooves in the axial direction), and a dimension X1 in the axial direction of the region above the center m in the axial direction is larger than a dimension X2 in the axial direction of the region below. The outer circumferential surface 8b of the bearing sleeve 8 has one or a plurality of grooves 8b1 formed thereon in the axial direction throughout its length in the axial direction. In this embodiment, three grooves 8b1 are formed at circumferentially regular intervals in the axial direction.

Figure 3B:
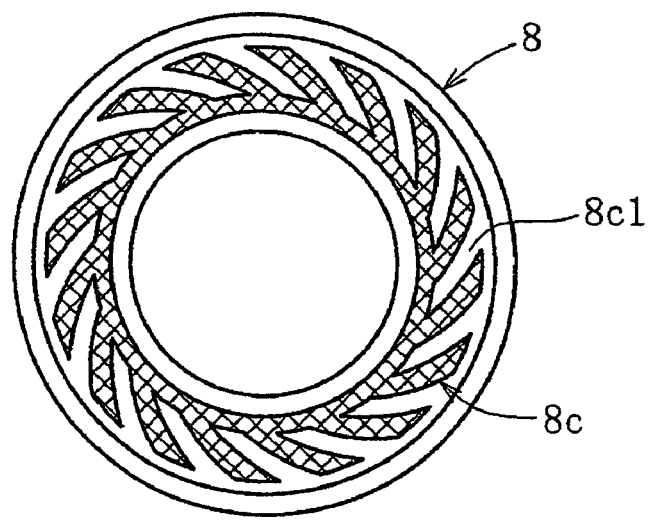
FIG. 3(b) is a drawing of the bearing sleeve seen from the direction of arrow A.

For example, as shown in FIG. 3(b), a hydrodynamic groove 8c1 is formed in the region which is a thrust bearing face of a thrust bearing portion T2 on a lower end face 8c of the bearing sleeve 8.

Figure 4:
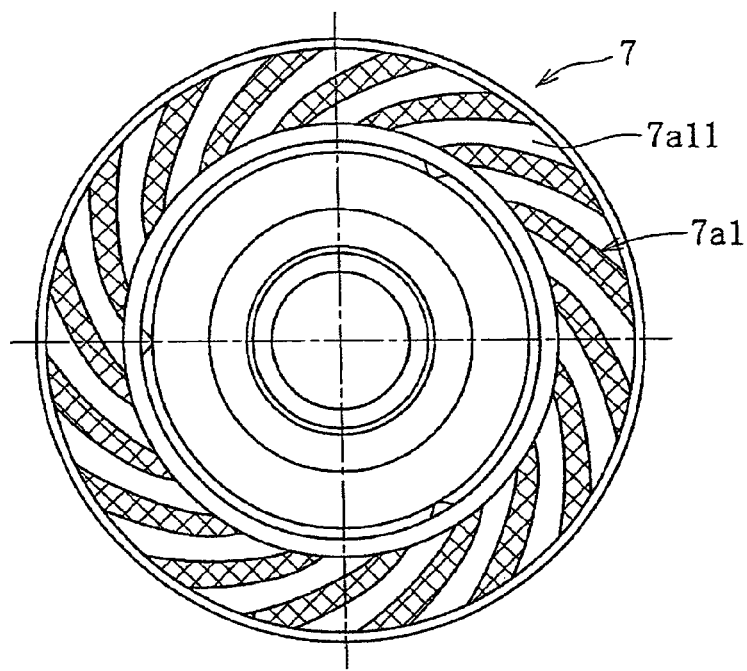
FIG. 4 is a drawing of a housing seen from the direction of arrow B.

The housing 7 comprises a cylinder side portion 7a and a bottom 7b disposed at the bottom edge side of the side portion 7a, and at least the side portion 7a is formed from a resin material. For example, a hydrodynamic pressure groove 7a11 is formed in the region which is the thrust bearing face of a thrust bearing portion T1 on a top end face 7a1 of the side portion 7a as shown in FIG. 4. This hydrodynamic pressure groove 7a11 can be formed simultaneously with the side portion 7a by forming the molding pattern of the hydrodynamic pressure groove 7a11 on the surface of the mold which forms the side portion 7a of the housing 7 and transferring the shape of the molding pattern to the top end face 7a1 of the side portion 7a when the side portion 7a is formed.

The bottom 7b separately formed from the side portion 7a is retrofitted to a lower part of the side portion 7a. The bottom 7b is formed from a metallic material or resin material. In the case of using the former, the bottom 7b is fixed to the side portion 7a by adhesive bonding or other means (including press fitting and adhesive bonding). In the case of using the latter, the bottom 7b is fixed to the side portion 7a by adhesive bonding, ultrasonic welding, laser welding or other means.

A tapered outer wall 7c whose diameter gradually expands upward is formed on the outer periphery of the side portion 7a. This tapered outer wall 7c forms an annular seal space S whose radial dimension is gradually reduced upward from the bottom 7b side of the housing 7 between itself and the inner periphery face 9b1 of the cylindrical portion 9b. This seal space S communicates with the outer diameter side of the thrust bearing gap of the thrust bearing portion T1 when the shaft unit 2 and the hub unit 9 are in rotation.

The inside of the hydrodynamic bearing unit 1, including the inner pores (of the porous material structure) of the bearing sleeve 8, is filled with a lubricating oil. The surface of the lubricating oil is always maintained within the seal space S. Various oils are usable as the lubricating oil. Low evaporation rate and low viscosity are required particularly for lubricating oils for use in hydrodynamic bearing units for storage disk drive apparatuses such as hard disks. For example, ester-based lubricating oils such as dioctyl sebacate (DOS) and dioctyl azelate (DOZ) are suitable.

The high resistance to the ester-based lubricating oil (low oil absorbing property) described above is required for the above-mentioned housing 7 (the side portion 7a in this embodiment). In addition, the amounts of outgas generated and water absorbed during molding need to be suppressed as low as possible. High heat resistance is also required.

Examples of the usable resins which provides such required characteristics includes polyimide (PI), polyamide-imide (PAI), polyether ether ketone (PEEK), polyphenylene sulfide (PPS) and liquid-crystalline polymer (LCP). The housing 7 with excellent cleanliness, dimensional stability and heat resistance can be obtained by using these resins. Among these, liquid-crystalline polymer (LCP) is especially preferable considering costs and fluidity (viscosity) at the time of molding.

At least one of carbon fiber and inorganic fiber is added as a filler to a resin material based on a resin selected from the above resins. This enables reinforcement of the housing 7 and suppression of the dimensional changes associated with temperature changes of the housing 7, obtaining high dimensional stability. It is preferable that these fillers are contained in a total amount of 15-50 wt. % in the housing 7. This is because the amount smaller than the lower limit value of the above numerical value range may prevent the dimension stabilizing effect to be sufficiently produced, while the amount larger than the upper limit may lower the fluidity of the resin in a mold, adversely affecting the moldability of the housing 7.

Preferable inorganic fiber is especially that which does not contain silicon (Si). Examples include potassium titanate whiskers, zinc oxide whiskers, aluminum borate whiskers and the like. This is because when inorganic fiber containing silicon (Si) is used as a filler, gasified organic Si may recrystallize and deposit to the bearing unit and, for example, the disk surface of the hard disk which may lower the cleanliness of the bearing unit and its surroundings. The amount of the inorganic fiber added is preferably up to 40 wt. % in order to keep a preferable fluidity of the resin material in a mold.

When the housing 7 is formed by using carbon fiber as a filler, a part of the carbon fiber is protruded to the outside of or exposed at the molded surface of the housing 7. Accordingly, because of the presence of the carbon fiber in the housing 7, the air in the mold trapped within the resin material when the resin material is poured into the mold is discharged to the outside of the molded article through the interface between the carbon fiber exposed at the molded surface of the resin molded article and the resin material around this carbon fiber. Voids produced inside the housing 7 and blisters of the housing 7 can be thus prevented so that the moldability of the housing 7 can be increased. This degassing action by carbon fiber can be sufficiently conducted by adding 1 wt. % or higher of carbon fiber to the housing 7. The amount of carbon fiber added of over 40 wt. % may prevent the moldability and dimensional stability of the housing 7 to be maintained at appropriate levels. Therefore, the amount of carbon fiber added is preferably up to 40 wt. %.

The top end face 7a1 of the housing 7 constituting the thrust bearing face comes into slidable contact with the bottom end face 9a1 of the hub unit 9 (the rotational member 3) when the hydrodynamic bearing unit 1 starts or stops to rotate. Considering the wear resistance at this time, the carbon fiber content in the housing 7 is preferably 5-35 wt. %. This is because at least 5 wt. % of carbon fiber is necessary to effectively improve the wear resistance of the housing 7, and the above described content needs to be up to 35 wt. % to ensure sufficient stretching when other components (e.g., the bottom 7b, etc.) are pressed into the housing 7.

Examples of fillers usable for the resin material which forms the housing 7 include powdery conductive agents, e.g., carbon black, in addition to the above mentioned carbon fiber and inorganic fiber. Carbon black is contained in the housing 7 preferably in an amount of 2-10 wt. %. For example, this enables the static electricity produced while the rotational member 3 is in rotation to be discharged to a grounding side component (the motor bracket 6 in this embodiment) via the housing 7, preventing other components (e.g., hard disk head) from being electrically charged. During the assembly process of the hydrodynamic bearing unit 1, components of the housing 7 and the like are sometimes electrostatically charged and therefore dusts deposit on these components. As mentioned above, electrostatic removability can be imparted to the housing 7 so that the deposition of dust on the components can be prevented and the cleanliness of the hydrodynamic bearing unit 1 can be maintained. Carbon black is normally contained in the housing 7 in the form of agglomerations of minute particles. For example, the residues molded on the spool and runner are fused and mixed for recycling when the housing 7 is molded, whereby the agglomerated minute particles are dispersed. Accordingly, repeated recycling of the waste material of the housing 7 does not deteriorate the conductivity of the housing 7.

When the housing 7 includes welded joints with other components (e.g., the bottom 7b, etc.), the moldability and dimensional stability of the housing 7 can be maintained and at the same time the welding force with other components can be sufficiently ensured by limiting the total amount of the filler contained in the housing 7 up to 35 wt. %.

As already mentioned, a housing with high oil resistance, low outgassing property, low water absorbing property and high heat resistance can be formed by forming the housing 7 from the above mentioned resin material. This enables to keep the cleanliness the hydrodynamic bearing unit 1 and a disk drive apparatus incorporating this bearing unit at a high level. Furthermore, the housing 7 with excellent moldability, dimensional stability and electrostatic removability can be obtained by, for example, injection-molding a resin material containing appropriate amounts of carbon fiber, inorganic fiber or conductive agents such as carbon black depending on its use.

When the rotational member 3 (the shaft unit 2) of the hydrodynamic bearing unit 1 rotates, the two upper and lower regions, which are the radial bearing faces of the inner peripheral face 8a of the bearing sleeve 8, oppose across the outer circumferential surface 2a of the shaft unit 2 and the radial bearing gap, respectively. The lubricating oil filled in the radial bearing gap then generates a hydrodynamic effect with the rotation of the shaft unit 2. The shaft unit 2 is rotatably supported in a non-contact manner by the pressure in the radial direction. Thus, the first radial bearing portion R1 and the second radial bearing portion R2 which rotatably support the rotational member 3 in the radial direction in a non-contact manner are constituted. A thrust bearing gap is formed between the top end face 7a1 of the side portion 7a of the housing 7 and the lower end face 9a1 of the hub unit 9 formed integrally with the shaft unit 2. The lubricating oil filled in the thrust bearing gap generates a hydrodynamic effect with the rotation of the rotational member 3. The rotational member 3 is rotatably supported in a non-contact manner in the thrust direction by the pressure. Thus, the thrust bearing portion T1 which rotatably supports the rotational member 3 in the thrust direction in a non-contact manner is constituted. Likewise, a thrust bearing gap is formed between the lower end face 8c of the bearing sleeve 8 and the topside end face 10a of the flange portion 10 of the shaft unit 2. The hydrodynamic effect of the lubricating oil is caused in this thrust bearing gap, and a second thrust bearing portion T2 which supports the rotational member 3 in the thrust direction in a non-contact manner is formed.

The first embodiment of the present invention was described above, but the present invention is not limited to this embodiment.

In the above-described first embodiment, the top end face 7a1 of the side portion 7a of the housing 7 is provided with a thrust bearing face having the hydrodynamic pressure groove 7a11 (the thrust bearing portion T1), and the lower end face 8c of the bearing sleeve 8 is provided with a thrust bearing face having the hydrodynamic groove 8c1 (thrust bearing portion T2). The present invention, however, can be applied to a hydrodynamic bearing unit provided with only the thrust bearing portion T1 as well. In this case, the shaft unit 2 is in a straight shape which does not have the flange portion 10. Therefore, the housing 7 can be shaped in the form of a closed-bottom cylinder integrally with the side portion 7a by forming the bottom 7b from a resin material.

Figure 5:
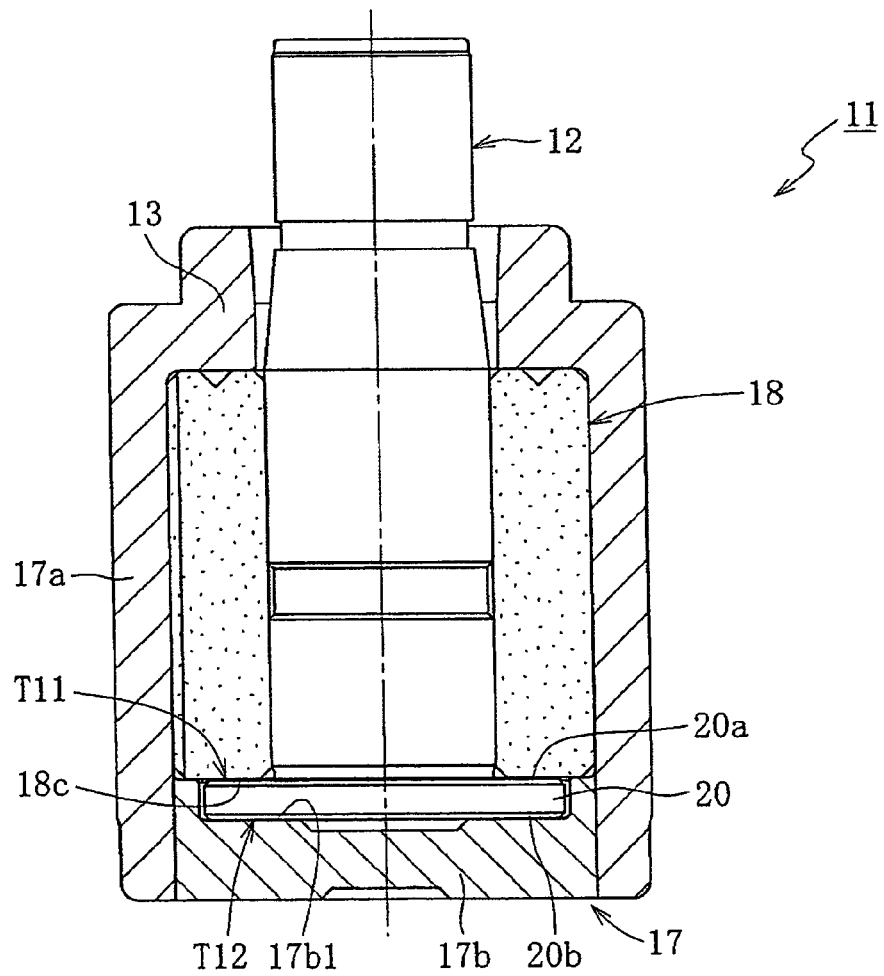
FIG. 5 is a cross-sectional view of a hydrodynamic bearing unit according to the second embodiment of the present invention.

FIG. 5 shows the hydrodynamic bearing unit 11 according to a second embodiment. In this embodiment, a shaft unit (rotational member) 12 comprises a flange portion 20 integrally or separately provided at the bottom edge thereof. The housing 17 comprises a cylinder side portion 17a and a bottom 17b structured separately from the side portion 17a and disposed at the bottom edge of the side portion 17a. A sealing member 13 which protrudes to the inner peripheral side is formed at the upper end of the side portion 17a of the housing 17. For example, a hydrodynamic pressure groove in a spiral shape is formed on an inner bottom face 17b1 of the bottom 17b of the housing 17, which is not shown in the FIG. 5, while a hydrodynamic pressure groove in a similar shape is formed on a lower end face 18c of the bearing sleeve 18. The thrust bearing portion T11 is formed between a lower end face 18c of the bearing sleeve 18 and an upper end face 20a of the flange portion 20 of the shaft unit 12. The thrust bearing portion T12 is formed between the inner bottom face 17b1 of the bottom 17b of the housing 17 and a lower end face 20b of the flange portion 20.

In this embodiment, the side portion 17a of the housing 17, as well as the sealing member 13, is formed from the resin material. Accordingly, the housing 17 with excellent cleanliness, dimensional stability, moldability and electrostatic removability can be obtained by choosing a resin material and filler similar to these in the above-described first embodiment for the side portion 17a of the housing 17. When the bottom 17b is formed from a resin material, a material constitution similar to that of the side portion 17a can be used. In this case, the bottom 17b is fixed to the side portion 17a by means such as ultrasonic welding, and thus the total amount of the filler in the side portion 17a of the housing 17 is preferably 35 wt. % or lower, considering the weldability.

FIG. 6 shows a hydrodynamic bearing unit 21 according to a third embodiment. In this embodiment, a sealing member 23 is formed separately from a side portion 27a of a housing 27 and pressed into or fixed by means such as welding to the inner periphery of an upper end portion of the housing 27. A bottom 27b of the housing 27 is die-formed using a resin material integrally with the side portion 27a of the housing 27, having a closed-bottom cylindrical shape. Further explanation is omitted since the rest of the constitution is according to as that in the second embodiment.

In this embodiment, the housing 27, which integrally consists of the side portion 27a and the bottom 27b, is formed from a resin material. Accordingly, the housing 27 with excellent cleanliness, dimensional stability, moldability and electrostatic removability can be obtained by choosing a resin material and a filler similar to those of the above-described first embodiment for the housing 27.

EXAMPLES

To demonstrate the advantages of the present invention, the housing 7 was formed by using liquid-crystalline polymer (LCP) as a base material and fillers at different formulation ratios. The fillers were carbon fiber, inorganic fiber (such as aluminum borate whisker, zinc oxide whisker) and carbon black. The characteristics required for the housing 7 of the resulting housings were compared.

In this Example, the following products were used: H3110 manufactured by Nippon Steel Chemical Co., Ltd. as an ester-based lubricating oil; a powdery liquid-crystalline polymer as liquid-crystalline polymer (LCP) (preparation method will be described below); Besfight HTA-C6-E manufactured by Toho Tenax Co., Ltd. as a carbon fiber; Alborex Y manufactured by Shikoku Corporation as an aluminum borate whisker; Panatetra WZ-0501 manufactured by Matsushita Electric Industrial Co., Ltd. as a zinc oxide whisker; and Ketchen Black EC manufactured by Lion Corporation as carbon black. Polytetrafluoroethylene (PTFE) was also used as a mold releasing agent in this Example, which was specifically KT-300M manufactured by Kitamura Ltd. The preparation method of the powdery liquid-crystalline polymer (LCP) is as follows:

[Preparation Method of the Powdery Liquid-Crystalline Polymer (LCP)]

A reactor equipped with an agitator, a torque meter, a nitrogen gas inlet, a thermometer and a reflux condenser was charged with 994.5 g (7.2 mol) of p-hydroxybenzoic acid, 446.9 g (2.4 mol) of 4,4'-dihydroxybiphenyl, 299.0 g (1.8 mol) of terephthalic acid, 99.7 g (0.6 mol) of isophthalic acid and 1347.6 g (13.2 mol) of acetic anhydride. The atmosphere in the reactor was sufficiently replaced with nitrogen gas. The temperature in the reactor was raised to 150° C. in a stream of nitrogen gas over 30 minutes and was maintained for 3 hours to reflux. While removing the distilling by-product, acetic acid, and unreacted acetic anhydride, the temperature was raised to 320° C. over 2 hours and 50 minutes. The contents were drawn out at the point when an increase in the torque was observed, which was regarded as the end of the reaction. The obtained solid content was cooled to room temperature and pulverized by a coarse grinder. The temperature of the solid content was raised from room temperature to 250° C. over 1 hour under a nitrogen atmosphere; from 250° C. to 280° C. over 5 hours; and then maintained at 280° C. for 3 hours to promote a polymerization reaction in the solid phase. A powdery liquid-crystalline polymer (LCP) having a flow starting temperature of 327° C. was thus obtained.

FIG. 7 shows the test results relating to the housing 7 containing mainly inorganic fiber (aluminum borate whisker or zinc oxide whisker) and carbon black as fillers at different formulation ratios. As Comparative Examples 3 and 5, if the total amount of the fillers is higher than 50 wt. %, problems are caused in moldability and stretching regardless of the type of resins and fillers. In contrast, good results were obtained in Formulation Examples 1-4 according to the present invention in every aspect, i.e., moldability, dimensional stability (low linear expansion coefficient), electrostatic removability and stretching, compared to Comparative Examples. In Formulation Example 4, a degassing effect within the resin material was observed.

FIG. 8 shows the test results relating to the housing 7 containing fillers, i.e., carbon fiber, inorganic fiber (aluminum borate whisker), and carbon black at different formulation ratios. As shown in Comparative Examples 6-8, the housings containing no carbon fiber had poor wear resistance. Moreover, as shown in Comparative Example 10, the excessive amount of carbon fiber added (higher than 35 wt. %) damage the object member (the rotational member 3, etc.), lowering the wear resistance. In contrast, as shown in Formulation Examples 5-7, the housings containing carbon fiber in an amount of 5 wt. % or higher showed good wear resistance.

INDUSTRIAL APPLICABILITY

The abode-mentioned bearing unit is suitable for a spindle motor for information appliances, for example, magnetic disk drive apparatuses such as HDDs, optical disk drive apparatuses such as CD-ROMs, CD-R/RWs, DVD-ROMs/RAMs and magneto-optical disk drive apparatuses such as MDs and Mos; and a polygon scanning motor for a laser beam printer (LBP); and a small motor such as an axial fan motor and the like.

The invention claimed is:

1. A hydrodynamic bearing unit comprising:
a housing having a bottom;
a bearing sleeve fixed to the inner periphery of the housing;
a rotational member which rotates relative to the bearing sleeve and the housing; and
a seal space for sealing in a lubricating fluid,
wherein the rotational member is supported in a non-contact manner in radial and thrust directions by a hydrodynamic effect of the lubricating fluid occurring in a bearing gap,
wherein the housing includes a thrust bearing face forming a thrust bearing gap between the housing and the rotational member, or a sealing surface forming the seal space between the housing and the rotational member,
wherein the lubricating fluid is an ester-based lubricating oil, and the housing is formed from a liquid-crystalline polymer (LCP)-based resin material of wholly aromatic polyester,
wherein the resin material includes a filler mixed therein, and the filler includes carbon fiber, and
wherein the resin material contains at least 50 wt. % of the liquid-crystalline polymer (LCP) and 15-40 wt. % of the carbon fiber.

2. A hydrodynamic bearing unit according to claim 1, wherein the total amount of the filler is 15-50 wt. %.

3. A hydrodynamic bearing unit according to claim 2, wherein the upper limit of the total amount of the filler is 35 wt. %.

4. A hydrodynamic bearing unit according to claim 2, wherein a powdery conductive agent is added to the filler.

5. A hydrodynamic bearing unit according to claim 4, wherein the powdery conductive agent contains 2-10 wt. % of carbon black.

6. A hydrodynamic bearing unit according to claim 1, wherein the resin material further includes inorganic fiber mixed therein.

7. A hydrodynamic bearing unit according to claim 6, wherein the inorganic fiber does not contain silicon (Si).

8. A hydrodynamic bearing unit according to claim 6, wherein the inorganic fiber is a whisker.

9. A hydrodynamic bearing unit according to claim 1, wherein the housing includes the thrust bearing face, and the thrust bearing face supports the rotational member in a non-contact manner in the thrust direction.

10. A hydrodynamic bearing unit comprising:
a housing having a bottom;
a bearing sleeve fixed to the inner periphery of the housing;
a rotational member which rotates relative to the bearing sleeve and the housing; and
a seal space for sealing in a lubricating fluid,
wherein the rotational member is supported in a non-contact manner in radial and thrust directions by a hydrodynamic effect of the lubricating fluid occurring in a bearing gap,
wherein the housing includes a thrust bearing face supporting the rotational member in a non-contact manner in the thrust direction,
wherein the lubricating fluid is an ester-based lubricating oil, and the housing is formed from a liquid-crystalline polymer (LCP)-based resin material of wholly aromatic polyester,
wherein the resin material includes a filler mixed therein, and the filler includes carbon fiber, and
wherein the resin material contains at least 50 wt. % of the liquid-crystalline polymer (LCP) and 5-35 wt. % of the carbon fiber.

11. A hydrodynamic bearing unit according to claim 10, wherein the thrust bearing face is formed with a hydrodynamic pressure groove.

12. A hydrodynamic bearing unit according to claim 10, further comprising a sealing surface forming the seal space between the housing and the rotational member.

13. A hydrodynamic bearing unit according to claim 10, wherein the total amount of the filler is 15-50 wt. %.

14. A hydrodynamic bearing unit according to claim 13, wherein a powdery conductive agent is added to the filler.

15. A hydrodynamic bearing unit according to claim 14, wherein the powdery conductive agent contains 2-10 wt. % of carbon black.

16. A hydrodynamic bearing unit according to claim 10, wherein the resin material further includes inorganic fiber mixed therein.

17. A hydrodynamic bearing unit according to claim 16, wherein the inorganic fiber does not contain silicon (Si).

18. A hydrodynamic bearing unit according to claim 16, wherein the inorganic fiber is a whisker.

* * * * *